US006324963B1

(12) United States Patent
Cirasole

(10) Patent No.: US 6,324,963 B1
(45) Date of Patent: Dec. 4, 2001

(54) LIQUID CRYSTAL THERMOMETER FOR STEAMING PITCHERS

(76) Inventor: Vincent Cirasole, 86 Oak St., Gonic, NH (US) 03839

( * ) Notice: Subject to any disclaimer, the term of this patent is extended or adjusted under 35 U.S.C. 154(b) by 0 days.

(21) Appl. No.: 09/586,236

(22) Filed: Jun. 2, 2000

(51) Int. Cl.[7] ............................. G01K 1/14; G01K 13/12; A47J 31/00
(52) U.S. Cl. ............................. 99/285; 99/323.3; 99/343; 374/150; 374/157; 374/162
(58) Field of Search ................... 99/285, 323.3, 99/342, 343, 275; 116/207, 216, 206; 374/150, 162, 157, 147, 137

(56) References Cited

U.S. PATENT DOCUMENTS

| 3,715,974 | * | 2/1973 | Beverett | 99/285 |
| 3,893,340 | * | 7/1975 | Parker | 116/216 X |
| 4,878,588 | * | 11/1989 | Ephraim | 374/150 X |
| 5,304,003 | | 4/1994 | Winnigner | 374/150 |
| 5,482,373 | * | 1/1996 | Hutchinson | 374/150 X |
| 5,588,747 | | 12/1996 | Blevins | 374/157 |
| 5,678,925 | * | 10/1997 | Garmaise et al. | 374/157 |
| 5,738,442 | * | 4/1998 | Paron et al. | 374/162 |

* cited by examiner

Primary Examiner—Reginald L. Alexander
(74) Attorney, Agent, or Firm—Kirkpatrick & Lockhart

(57) ABSTRACT

A steaming pitcher for preparing hot beverages with a liquid crystal thermometer attached to an exterior surface of the pitcher for detecting the temperature of any liquid contained therein. The liquid crystal thermometer eliminates the need for conventional food service thermometers that are placed in the liquid being heated.

19 Claims, 4 Drawing Sheets

LIQUID CRYSTAL THERMOMETER FOR STEAMING PITCHERS

BACKGROUND OF THE INVENTION

1. Field of the Invention

The present invention is directed to steaming pitchers for making hot beverages, and more particularly to temperature monitoring devices for detecting the temperature of fluids heated within steaming pitchers.

2. Description of the Relevant Art

The current practice in the specialty coffee industry is to use food service thermometers with metal probes that clip onto the edge of a steaming pitcher which is used to heat liquids such as milk. The individual heating liquid in the pitcher uses the thermometer to gauge the temperature of the milk as the milk is being steamed or frothed with a steam wand on a machine such as an espresso machine. The milk is then added to fresh brewed espresso to make the desired specialty coffee drink—a cappuccino or caffe latte, for example.

The problems typically encountered when using this type of thermometer are numerous. If the volume level of the milk in the steaming pitcher does not rise above the middle of the thermometer's probe, the temperature indicated on the dial will be inaccurate. When "frothing" milk for a cappuccino, the foam created has a low density, the temperature of which is not accurately measured using a conventional thermometer.

Operators need to periodically adjust the thermometer to assure accurate measure of temperature. Conventional thermometers, because they are directly exposed to the milk, must be kept clean to assure safety in terms of public health. Conventional thermometers are relatively fragile—they need to be replaced fairly often as they break or are found to be inaccurate.

One of the most common mistakes made by individuals who prepare specialty coffee drinks, such as cappuccino, is "scalding" the milk. Scalding is the process by which milk or other liquid is heated above a critical temperature, approximately 175° F. at which point the proteins in the milk are degraded. This not only affects the flavor of the drink produced, but more importantly, poses a threat of burning the consumer of the drink. This occurs very frequently, even when a conventional thermometer is used.

It has now been found that a liquid crystal thermometer (hereinafter "LCT"), properly affixed to a steaming pitcher solves each of the aforementioned problems. Although placing a thermometer on the exterior of a container is not new, the application to a steaming pitcher to solve problems unique to steaming pitchers is. For example, U.S. Pat. No. 5,304,003 to Winninger teaches the use of a LCT that is applied to the exterior surface of a back wall of an aquarium with the graduations facing the interior of the aquarium. Use of clear adhesive to form an airtight attachment of the LCT to the aquarium back wall enables one to view the LCT graduations through the aquarium walls from the front of the aquarium. Winninger's use of a inwardly facing LCT and use of transparent adhesives are not useful with respect to steaming pitchers which are typically made from stainless steel which is a well known opaque material.

U.S. Pat. No. 5,588,747 to Blevins discloses a LCT affixed to the exterior of a measuring cup which is preferably insulated. The thermometer, by design, is not used to detect the temperature of the contents of the cup particularly with respect cups that are insulated. Instead, the substances that will eventually be added to the cup are allowed to flow over the exterior of the cup and the thermometer until the substances reach the desired temperature. The substances are then placed in the cup.

Bleven's use of a LCT on the exterior of the container for measuring temperature of substances allowed to flow over the thermometer will not solve the problems associated with steaming pitchers. It is imperative that the thermometer affixed to the exterior of a steaming pitcher be able to accurately detect the temperature of the steaming pitcher contents while being heated in the pitcher and not before being introduced into the pitcher.

It is thus an object of the invention to provide a thermometer for steaming pitchers that is durable and will withstand substantial cycling between heating, cooling and cleaning cycles. Another object of the invention is to provide a thermometer that will accurately gauge the temperature of the liquid in the steaming pitcher. A further object of the invention is to provide a thermometer that cuts down on the effort needed to clean the temperature sensing device.

SUMMARY OF THE INVENTION

The steaming pitcher of the present invention is based on the recognition that conventional thermometers used to monitor the temperature of fluids in a pitcher have numerous flaws which affect the user's ability to make a desirable hot beverage. The invention described herein is a LCT for measuring temperatures from about 135° F. to 175° F. It consists of a plastic strip, with liquid crystal boxes indicating temperature, and one box at 155° F. offset to more easily read the desired temperature when steaming milk for specialty coffee drinks like cappuccinos. The thermometer is slightly thicker than a sheet of paper and can be secured to a pitcher by means of a self-adhesive backing which will withstand the temperature extremes of cycling a pitcher through heating, cooling and reheating but also from the potentially harsh effects of washing the pitcher to which the thermometer is attached.

In one embodiment, the LCT is integrated into the body of the steaming pitcher so that it is permanent. The LCT is fixed to the pitcher with adhesive such as in the form of a self-adhesive strip.

Because of the high degree of thermal conductivity and the low positioning of the LCT on the lower portion of the steaming pitcher, the LCT will give a more accurate indication of the temperature of the milk within the pitcher, particularly in low volume situations or when "frothing" milk from a cappuccino. LCTs never need adjustment. Temperature is thus always measured accurately.

As the LCT is affixed to the exterior of the steaming pitcher, it eliminates the necessity of inserting a conventional thermometer into the milk, completely removing any public health risk associated with introducing a potential bacteria-ridden object into the holding portion of a pitcher.

An LCT is a relatively durable device which provides an easy means of replacement, i.e., the LCT need only be removed from the outside of the pitcher by defeating the strength or holding power of the adhesive used to hold the LCT to the pitcher. This is accomplished by the implementation of physical force or with suitable adhesive solvents as is well known in the art.

A liquid crystal thermometer properly affixed to a steaming pitcher should be both more accurate and more easy to use than a conventional thermometer thereby minimizing the propensity of heating the milk above the desired temperature. With the ideal temperature indicator offset in the design of the unit, ease of reference to determine when the milk has accurately reached the ideal temperature of 155° F. is achieved. These and other objects and features of the present invention will be apparent from a review of the drawings and a reading of the following detailed description of the invention.

DETAILED DESCRIPTION OF THE DRAWINGS

DETAILED DESCRIPTION OF THE INVENTION

Figure 1:
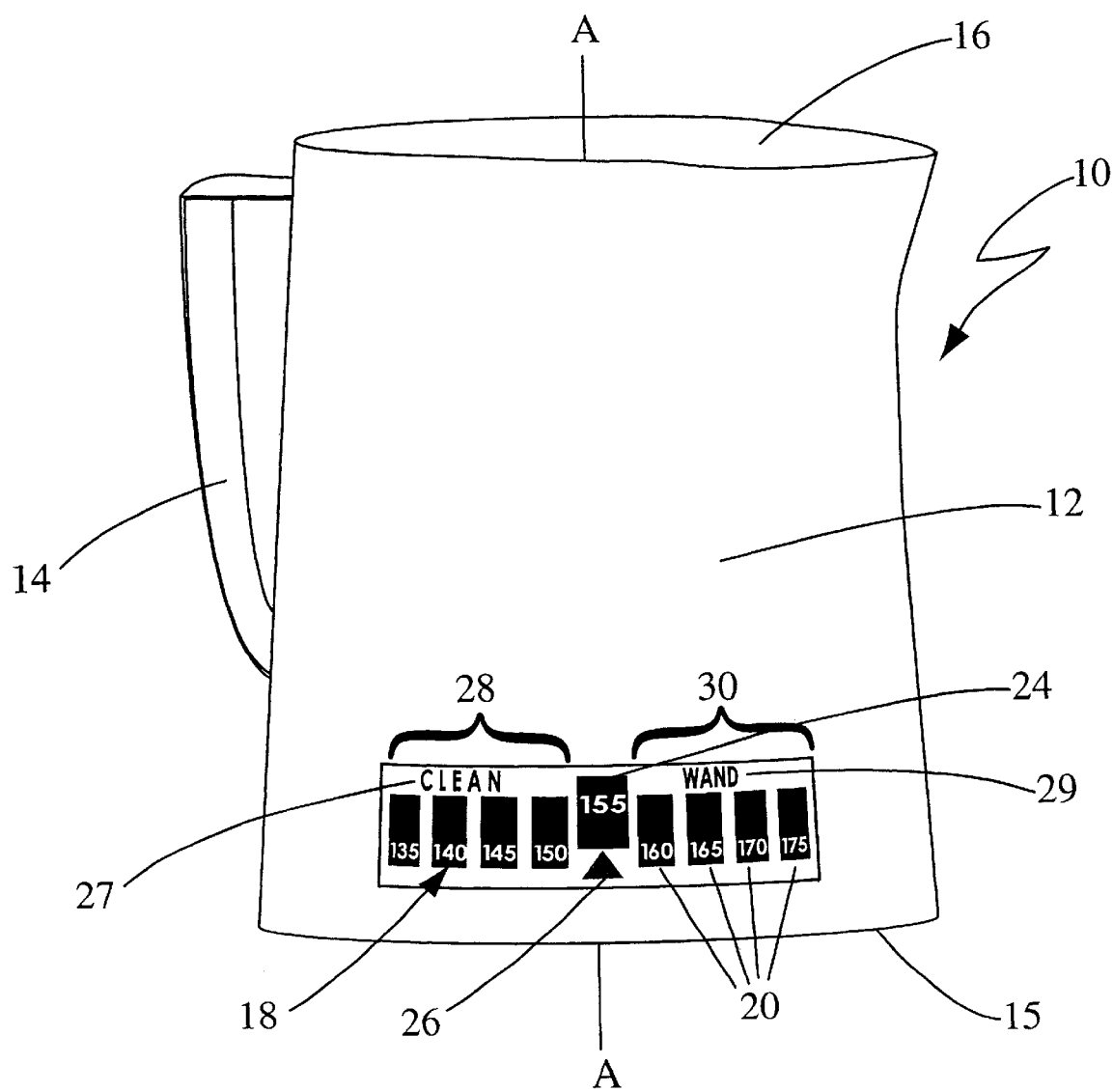
FIG. 1 is a side elevational view of a steaming pitcher/thermometer assembly according to one embodiment of the invention.
Figure 3:
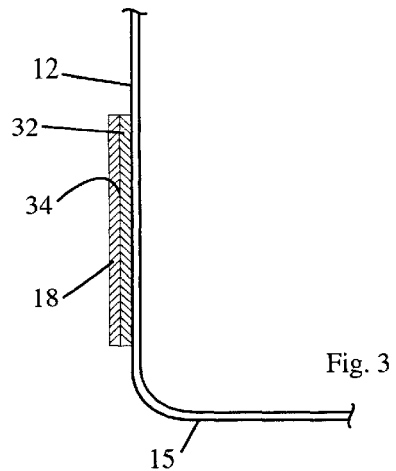
FIG. 3 is a partial sectional view of a steaming pitcher/thermometer according to one embodiment of the invention.

Referring to FIG. 1, a pitcher 10 is shown. Pitcher 10 has a main body 12 to which a handle 14 is affixed. Main body 12 has a bottom 15 and portions which define a receptacle 16 for receiving and containing fluids. A liquid crystal thermometer 18 is affixed to main body 12. Preferably, LCT 18 is secured to Pitcher 10 with an adhesive strip 20 as shown in FIG. 3. To maximize the accuracy and effectiveness of LCT 18, LCT 18 is preferably situated on pitcher 10 in close proximity to bottom 15 to ensure that the fluid temperature is accurately detected no matter what volume of receptacle 16 is occupied by fluid.

LCT 18 has a plurality of compartments 20 which house the liquid crystal compositions. It is to be understood that the particular liquid crystal compositions are not part of the invention. Compartments 20 are preferably labeled with numeric designations 22 which signify the particular temperature in either Celsius or Fahrenheit (° F. shown), that is being detected by the particular compartment.

To render LCT 18 more convenient for the purpose of preparing particular beverages such as cappuccino, center compartment 24 is sized to be larger than the remaining compartments 20. Compartment 24 is enlarged to designate and emphasize the preferred temperature of the liquid being heated. It is to be understood that the liquid crystal compositions situated in compartments 20 can be formulated for a wide range of temperatures. Preferably, the temperature range that can be detected by LCT 18 is about 120° F. to 190° F.

The temperatures detected by the liquid crystals in the plurality of compartments 20 are preferably detected in 5° F. increments but can be detected in a variety of incrementally sized steps such as 1° F. steps, 2° F. steps, 10° F. steps, etc. It should be further understood that the size and shape of compartments 20 are subject to many variations depending upon the needs of the user. For example, compartments 20 can be made large, square and/or oval in shape, with large numeric designations to accommodate an individual with failing eyesight. In an alternate embodiment, only one compartment 20 is provided that contains a liquid crystal formula that is formulated to detect the optimum desired temperature of the fluid being heated.

Figure 2:
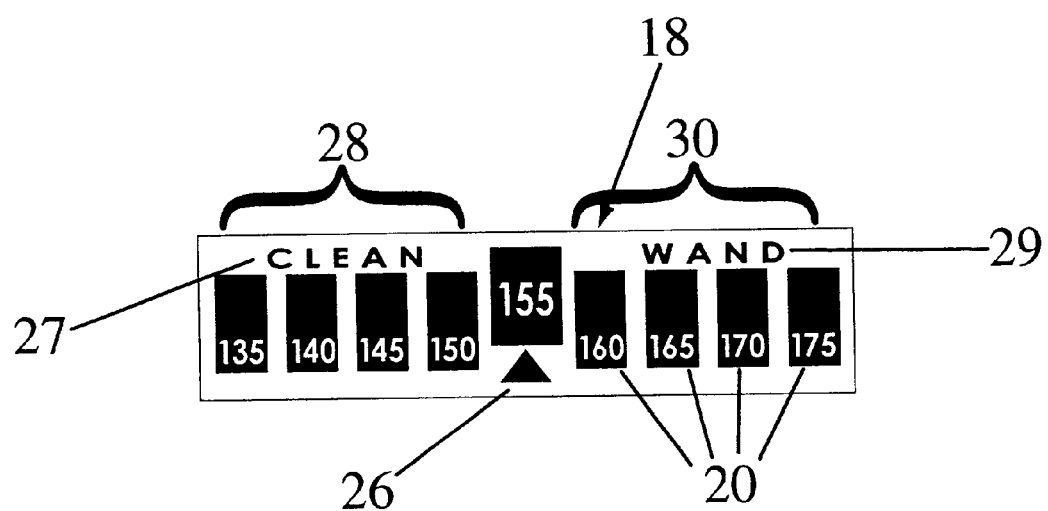
FIG. 2 is a front elevational view of a LCT according to one embodiment of the invention.

To further accentuate compartment 24, an additional reference designation such as arrow 26 can be provided as a visual reference as shown in FIGS. 1 and 2. An optional visual reminder to clean the steaming wand used to froth the liquids being heated after use can be provided by including the term "CLEAN" 27 situated above a first compartment set 28 and "WAND" 29 situated above a second compartment set 30. The terms can be placed on any location on LCT 18 to improve the functionality of LCT 18.

Figure 7:
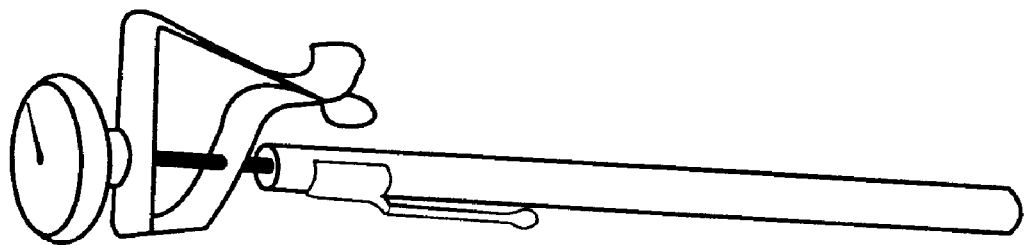
FIG. 7 is a perspective view of a food service thermometer in the prior art.

Unlike the prior art references discussed above and as shown in FIG. 7, LCT 18 is particularly suited for attachment on the exterior of steaming pitchers which are invariably made from stainless steel. As is well known in the art, stainless steel is a good heat conductor so that any heat detected by LCT 18 on an exterior surface of pitcher 10 will accurately depict the temperature of the fluid being heated.

Figure 4:
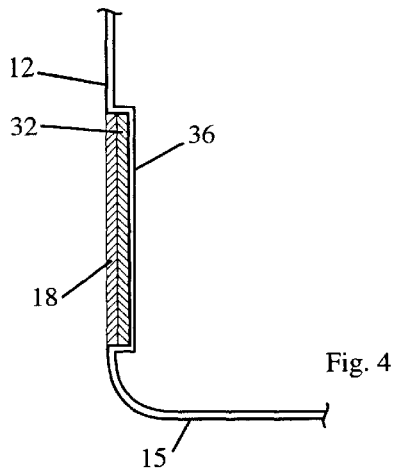
FIG. 4 is a partial sectional view of a steaming pitcher/thermometer according to one embodiment of the invention.
Figure 5:
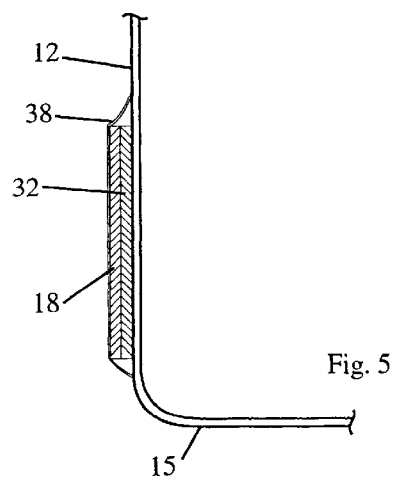
FIG. 5 is a partial sectional view of a steaming pitcher/thermometer according to one embodiment of the invention.
Figure 6:
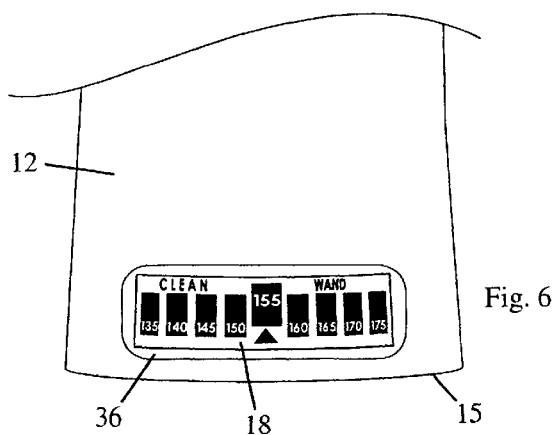
FIG. 6 is a partial front elevational view of a steaming pitcher/thermometer according to one embodiment of the invention.

LCT 18 can be secured to pitcher 10 in a variety of ways in a variety of positions. As shown in FIGS. 3 and 4, LCT 18 is secured to pitcher 10 via an adhesive layer 32. In one embodiment, a self-adhesive strip is provided on a back side 34 of LCT 18 for ease of attachment to pitcher 10. In another embodiment as shown in FIGS. 4 and 6, LCT 18 is set into a depression 36 formed on pitcher 10 to protect the edges of LCT 18 from being pried off through the course of normal use and cycling. Depression 36 is preferably as deep as LCT 18 and adhesive layer 32. Alternatively, a clear transparent coating can be placed over LCT 18 to provide further protection against wear as shown in FIG. 5.

In other embodiments, LCT 18 can be placed at locations other than close to bottom 15 and can be placed in a vertical or diagonal position relative to the longitudinal axis of pitcher 10.

While the invention has been particularly shown and described with reference to the aforementioned embodiments, it will be understood by those skilled in the art that various changes in form, composition and detail may be made therein without departing from the spirit and scope of the invention. Thus, any modification to the shape, configuration and/or composition of the elements comprising the invention is within the scope of the present invention.

Having thus described my invention, what I claim as new and desire to secure by U.S. Letters Patent is:

1. A pitcher for heating fluids comprising:
   a main body adapted to conduct heat and having portions defining a receptacle;
   a bottom heating surface; and,
   a liquid crystal thermometer attached to an exterior surface of the main body and free of communication with an interior surface of the pitcher.

2. The pitcher of claim 1 wherein the main body has portions defining a depression for receiving the liquid crystal thermometer.

3. The pitcher of claim 2 wherein the liquid crystal thermometer is situated proximal to the bottom of the pitcher.

4. The pitcher of claim 1 wherein the liquid crystal thermometer is situated proximal to the bottom of the pitcher.

5. The pitcher of claim 4 wherein the liquid crystal thermometer is covered with a clear plastic coating.

6. The pitcher of claim 1 wherein the temperature detection range of the liquid crystal thermometer is from about 120° F. to about 190° F.

7. The pitcher of claim 1 wherein the liquid crystal thermometer comprises a plurality of compartments wherein each compartment of the plurality of compartments detects a different temperature.

8. The pitcher of claim 7 wherein the plurality of compartments detect heat changes in ° F. or ° C. increments.

9. The pitcher of claim 7 wherein the plurality of compartments detect heat changes in 5° F. increments.

10. The pitcher of claim 7 wherein the plurality of compartments comprises a central compartment which designates a preferred temperature.

11. The pitcher of claim 10 wherein the preferred temperature is 155° F.

12. The pitcher of claim 7 further comprising an arrow designation provided on the liquid crystal thermometer and pointing toward a compartment of the plurality of compartments that detects a preferred temperature.

13. The pitcher of claim 1 wherein the liquid crystal thermometer is placed perpendicular or parellel to a longitudinal axis of the pitcher.

14. The pitcher of claim 1 wherein the liquid crystal thermometer is placed diagonally relative to a longitudinal axis of the pitcher.

15. The pitcher of claim 1 wherein the liquid crystal thermometer is attached to the pitcher with an adhesive.

16. A pitcher for heating fluids comprising:

a main body having portions defining a receptacle;

a bottom; and, a liquid crystal thermometer attached to an exterior surface of the main body wherein the liquid crystal thermometer comprises a plurality of compartments wherein each of the plurality of compartments detects a different temperature from about 120° F. to about 190° F. and wherein a central compartment of the plurality of compartments is larger than the other compartments.

17. A method of detecting the temperature of a fluid in a pitcher comprising the steps of:

providing a pitcher having portions defining a receptacle for receiving a fluid and having a bottom;

providing a liquid crystal thermometer attached to an exterior surface of the pitcher and free of communication with an interior surface of the pitcher wherein the liquid crystal thermometer comprises a plurality of compartments wherein each of the plurality of compartments detects a different temperature;

filling the pitcher with a fluid;

heating the fluid; and, detecting the temperature of the fluid with the liquid crystal thermometer.

18. The method of claim 17 wherein the temperature detected ranges from about 120° F. to about 190° F.

19. The method of claim 18 comprising the further step of providing a depression on the pitcher for receiving the liquid crystal thermometer such that the thermometer will be flush with the exterior surface of the pitcher.

* * * * *